United States Patent [19]

Brucker

[11] Patent Number: 4,907,870

[45] Date of Patent: Mar. 13, 1990

[54] DEVICE TO MANIPULATE SIDE VIEW MIRRORS FOR MOTOR VEHICLES

[76] Inventor: Milton Brucker, 10110 Empyrean Way, Los Angeles, Calif. 90067

[21] Appl. No.: 336,340

[22] Filed: Apr. 10, 1989

Related U.S. Application Data

[63] Continuation of Ser. No. 37,255, Apr. 10, 1987, abandoned.

[51] Int. Cl.⁴ .......................... B60R 1/08; G02B 7/18; G02B 5/08
[52] U.S. Cl. ...................................... 350/637; 350/635
[58] Field of Search ............... 350/637, 635, 632, 604, 350/605, 606, 632, 279, 281

[56] References Cited

U.S. PATENT DOCUMENTS

| 2,718,175 | 9/1955 | Gim | 350/637 |
| 4,171,875 | 10/1979 | Taylor et al. | 350/637 |
| 4,575,003 | 3/1986 | Brandt et al. | 350/631 |
| 4,640,590 | 2/1987 | Wunsch | 350/637 |
| 4,834,522 | 5/1989 | Janowicz | 350/637 |

FOREIGN PATENT DOCUMENTS

| 2856612 | 7/1900 | Fed. Rep. of Germany | 248/486 |
| 3501655 | 9/1906 | Fed. Rep. of Germany | 350/637 |
| 3509604 | 9/1906 | Fed. Rep. of Germany | 350/637 |
| 3533676 | 3/1907 | Fed. Rep. of Germany | 350/637 |
| 2736900 | 3/1979 | Fed. Rep. of Germany | 350/637 |
| 2932146 | 2/1981 | Fed. Rep. of Germany | 350/637 |
| 3207700 | 9/1983 | Fed. Rep. of Germany | 350/637 |
| 3341426 | 5/1985 | Fed. Rep. of Germany | 350/632 |
| 3509653 | 9/1986 | Fed. Rep. of Germany | 350/637 |
| 185340 | 10/1983 | Japan | 350/637 |

Primary Examiner—Jon W. Henry
Attorney, Agent, or Firm—Philip D. Junkins

[57] ABSTRACT

Side view mirrors are provided on motor vehicles. They give driver visibility to the rear and side of the vehicle. An area to the rear and side of the vehicle includes a blind area which becomes visible to the driver when the side view mirrors are rotated 3° to 4° beyond their conventional setting through actuation of a manipulatable button adjacent the driver's seat or actuation of the turning lever. Instantaneous initial movement of the side view mirror to cover the blind spot through fast moving mechanism is accompanied by a dwell of approximately two seconds to retain visiblity for a needed intravel after initial manipulation to initiate a turn or to permit opening of the driver's door into the adjacent lane of traffic during parallel parking to give visibility to the driver in the adjacent lane and blind area.

12 Claims, 3 Drawing Sheets

DEVICE TO MANIPULATE SIDE VIEW MIRRORS FOR MOTOR VEHICLES

RELATED APPLICATION

This application is a continuation of application Ser. No. 07/037,255 filed Apr. 10, 1987, now abandoned.

BACKGROUND OF THE INVENTION

1. Field of the Invention.

This invention relates to motor vehicle side view mirrors normally made to be adjustable in both vertical and horizontal directions which, however, even after they have a set position, are plagued by dead spots behind the driver, making right or left turns a danger which always exists when there is a motor vehicle close to the side and rear of the vehicle in question which is not clearly visible in a customary rear viewing side mirror because of the "blind spots". The instant device is intended to correct the blind spot problem by a new and improved, practical, effective and economical mechanism.

2. Brief Description of the Related Art.

The background of the invention with respect to adjustment to cover the blind spot before turning is exemplified in the U.S. Patent to Simmons, U.S. Pat. No. 3,199,075 for assignal control adjustable rear view mirror inside the motor vehicle. It incorporates a mechanism automatically moveable in response to operator-initiated signals, and includes an electrical circuit for rotating a shaft in response to the movement of the directional signal lever at angles such as 10° to 15° to the left or right of the lane in which the vehicle in question is travelling, with two solenoids to actuate the rear view mirror within the vehicle.

Other art known to the Applicant are the U. S. Patents granted to: Russell U.S. Pat. Nos. 3,519,336 and 3,486,811, McKee, et al 3,640,608 Gim 2,718,175, Moyer 3,820,877, Clontz 3,890,848, and Doeg 4,105,301; and German Patents granted to Janowicz 3,341,426, and Janowicz 3,509,654.

OBJECTS AND SUMMARY OF THE INVENTION

An object of the present invention is to provide a new and improved means and mechanism for side view mirrors providing a small adjustment of approximately 3° to 4° for efficiently and effectively correcting and overcoming the blind spot problem at the sides of the vehicle.

A more specific object of the invention is to provide a new and improved separate frame for a side view mirror for moving the mirror approximately 3° to 4° about its conventional preset vertical axis, and a new and improved solenoid and spring system which automatically adjusts the mirror angle and also automatically restores the side view mirror to its conventional rear view position.

It is another object of the invention to achieve instant and ready accessibility and simplicity in a versatile foolproof construction to accomplish the intended purpose.

With the above and other objects in view, this invention resides in the novel features of form, construction, arrangement, and combination of parts presently described and pointed out in the claims.

BRIEF DESCRIPTION OF THE DRAWINGS

Having described the invention in genera terms, reference will now be made to the accompanying drawings in which.

DETAILED DESCRIPTION OF THE PREFERRED EMBODIMENTS

Figure 1:
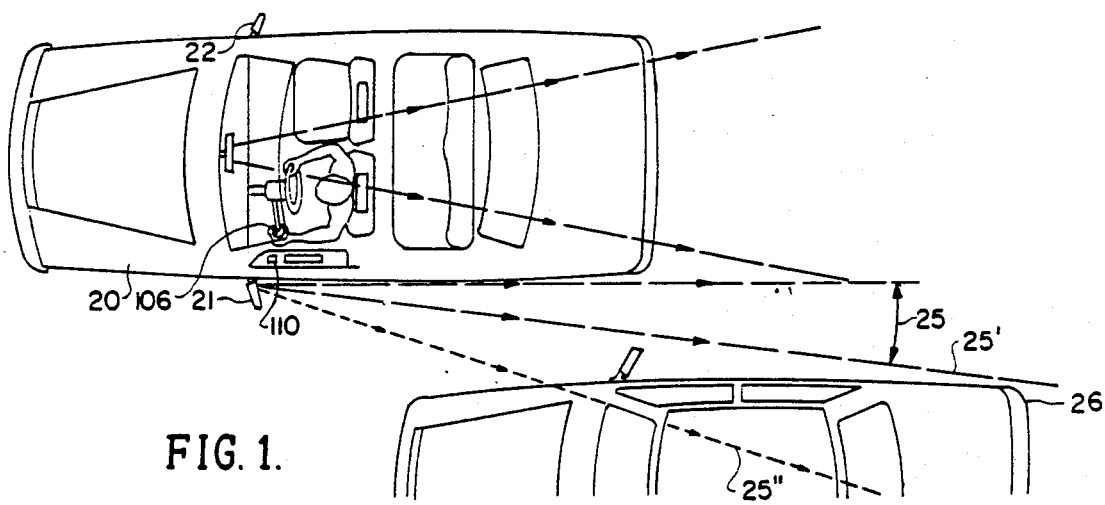
FIG. 1 is a top view, schematically illustrating a motor vehicle with side view mirrors and the blind area or spot.

Referring now in more detail and by reference characters to the drawings which illustrate preferred embodiments of the present invention, FIG. 1 illustrates a motor vehicle generally designated at 20, having left and right side view mirror assemblies 21 and 22 projecting on the left and right hand sides of the vehicle, respectively, and normally having a view angle 25 of plus or minus approximately 15°, leaving a blind spot or area there-adjacent and between broken lines 25' and 25" on each side of the vehicle in which another vehicle 26 is not visible.

Figure 2:
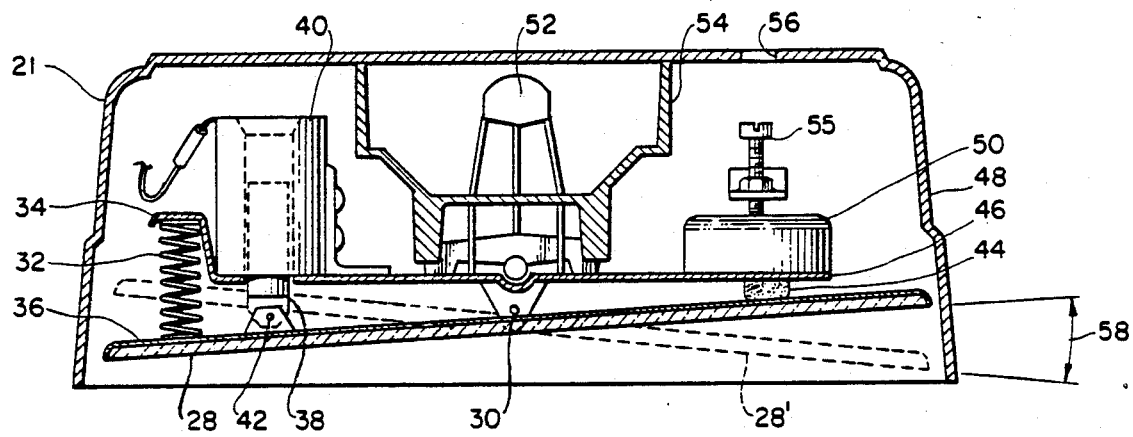
FIG. 2 is a top view in partial section of a side view mirror embodying a first preferred form of the invention.

By this invention, such blind areas are, however, swept to a desired and adjustable extent by appropriate pivoting of the mirrors 28 (within the mirror assemblies 21 or 22) about a vertical pivot such as 30 (FIG. 2). The mirror assembly 21 on the left or driver's side of the vehicle is normally angled as shown in solid outline in FIG. 2. The mirror 28 is capable of being tilted on said vertical pivot or axis 30 against the force of a coil spring 32, bearing against a mounting plate or member 34 at one end and against the mirror frame 36 at its other end, thus tilting the mirror 28 to the position 28' shown in dotted outline in IIG. 2, when the armature or push-rod 38 is drawn int the solenoid 40, articulating with the mirror through pin and bracket 42 with mirror pivot 30 as the axis of rotation. A rubber or other resilient stop 44 cushions the return of the mirror against the mounting plate 34 at its end 46 within the housing 48.

Ballast weight 50 absorbs the shock of the mirror when it is restored to its solid outline position 28 when the solenoid 40 is de-energized and spring 32 reasserts itself to its position of extension.

A basic adjustment mechanism 52 and pivot support 54 or mounting plate 34 sets the normal position of such plate and the mirror by extending or retracting a threaded bolt 55 relative to the counterweight 50 or other structure in which it can be threaded. Access thereto is by a screwdriver through an aligned hole 56 in the housing 48. The angle for eliminating the blind area can thus be adjusted to any desired degree, preferably from 2° to 6°, to accomplish its desired purpose.

In the remaining figures corresponding parts are given corresponding reference numerals.

Figure 3:
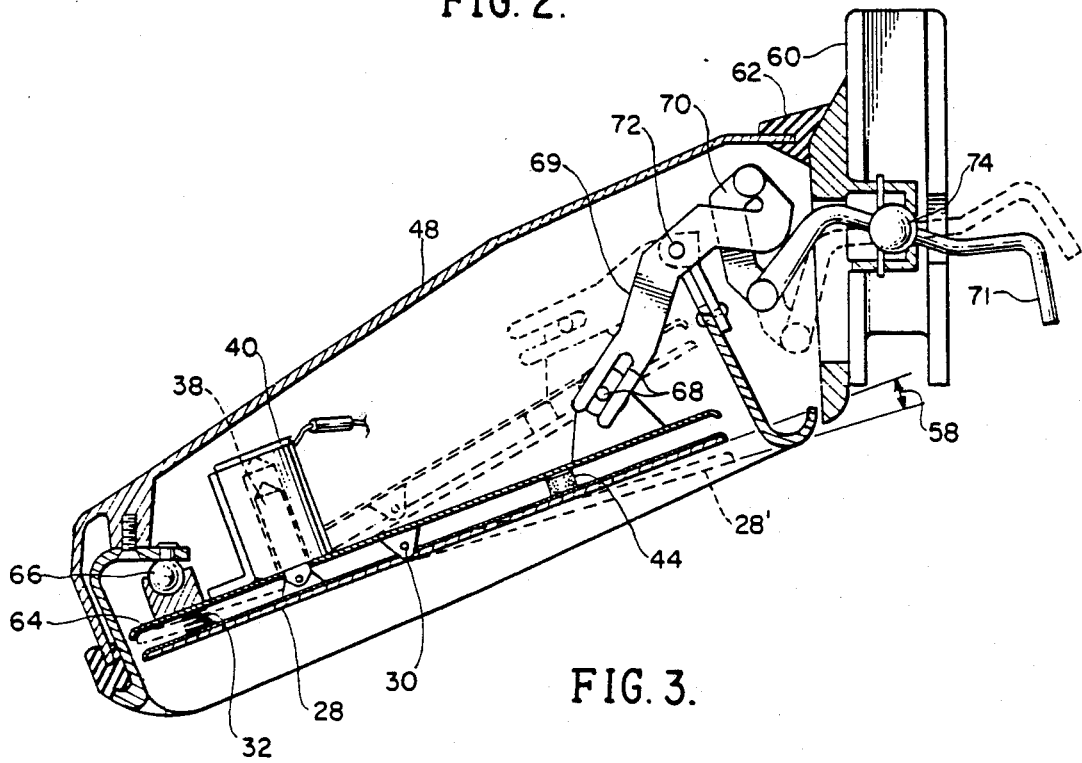
FIG. 3 is a similar top partially sectioned view illustrating a second preferred form of the invention.

In FIG. 3, a second preferred embodiment, the window frame 60 supports a housing through rubber seals 62. The mirror mounting plate 64 is pivoted on a uni-ball support 66. The counter-clockwise angle of adjustment of the mirror 28 around the mirror pivot 30 is limited by a rubber stop 44. The plunger 38, when drawn into the solenoid 40, rotates the mirror in a clockwise direction with respect to mounting plate 64 (in FIG. 3) against the force of the coil spring 32. Mirror housing 48 encloses the ensemble.

The mirror 28 and mounting plate 64 are adjustable together to various normal viewing positions around the axis of the uni-ball support 66 at the left hand end of mounting plate 64 as illustrated.

A uni-ball bracket assembly of pivoted levers provide a basic adjustment of the mirror and mounting plate through a pin-and-slot connection 68 and associated linkages 69, 70 and 71. The right-hand end of link 71 as illustrated in FIG. 3, provides manual control of the mirror mounting plate and mirror between its solid outline and dotted outline positions around pivots 72 and 74. Mirror pivot 30 provides additional adjustment, as shown in dotted outline at 28', around mirror pivot 30 to view and eliminate the blind area 25'-25''.

Figure 4:
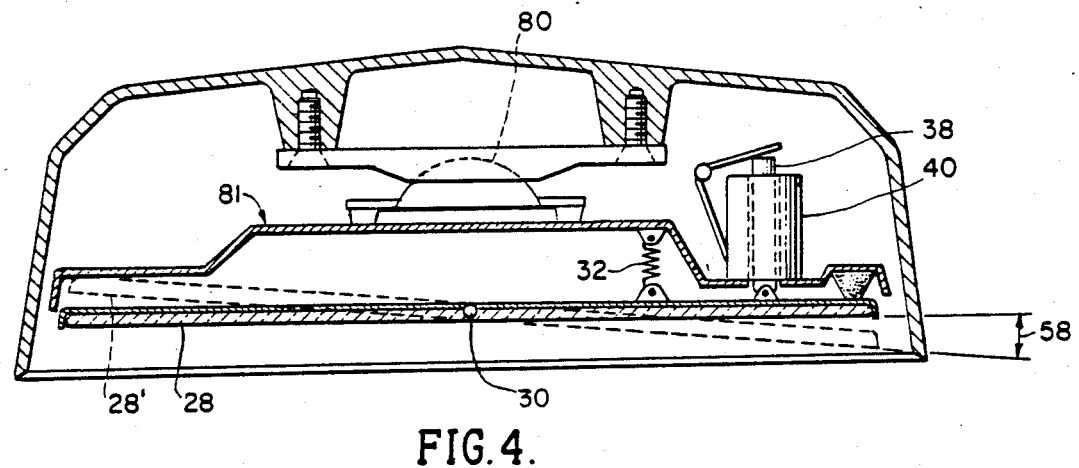
FIG. 4 is a top view partially in section illustrating a third preferred form of the invention.

A third preferred embodiment of the invention is illustrated in FIG. 4. Therein a swivel joint 80 adjusts the basic mirror mounting plate assembly 81 for said customary plus or minus 15° angle normally provided. It given additional sweep under the influence of the solenoid push rod 38 when energized by the solenoid 40 against the force of a retaining spring 32, changing the angle of the mirror from its solid outline position 28 to its dotted or phantom outline position 28' around pivot pin 30 suitably supported in the frame 81.

The fourth preferred embodiment of the invention (FIG. 5) has the mirror pivot 30 at its extreme left end as illustrated and mounts a cam surface 90 in confrontation with a cooperating cam surface 92 normally urged by spring 94 to the left as illustrated but which, under the influence of rod 96, is drawn into the solenoid 40 to deflect the mirror 28 from its solid outline position held by spring 98 to the dotted outline position thereof at 28' against the pull force of said spring, thus rapidly tilting the mirror into the blind area 58.

Figure 5:
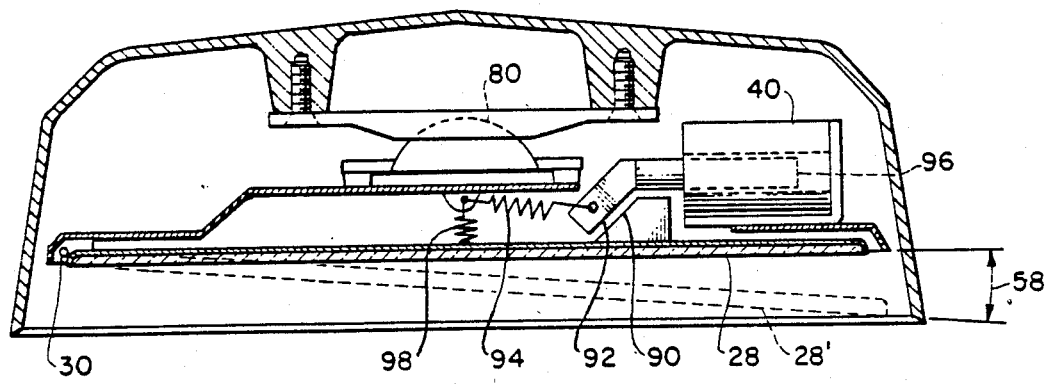
FIG. 5 is a similar top sectional view of a fourth preferred form of the invention.
Figure 6:
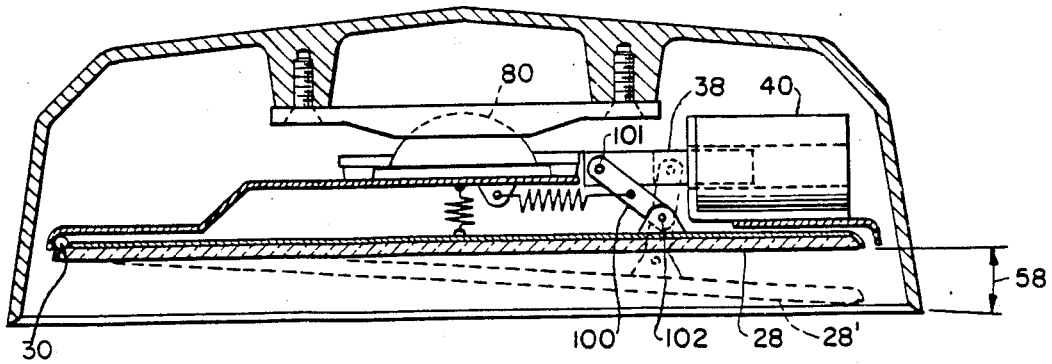
FIG. 6 is a top view partially in section illustrating a fifth preferred form of the invention.

The fifth preferred embodiment of the invention (FIG. 6) substitutes for the cam surfaces 90–92 of FIG. 5, a lever 100 pivoted at 101 and 102, and normally spring urged to the left as illustrated at 101. But, when the solenoid 40 is energized, the rod 38 is drawn to the right forcing the pivoted lever 100 to a vertical position shown in dotted outline, thereby sweeping the mirror through an arc making the blind area 58 visible to the driver.

Figure 7:
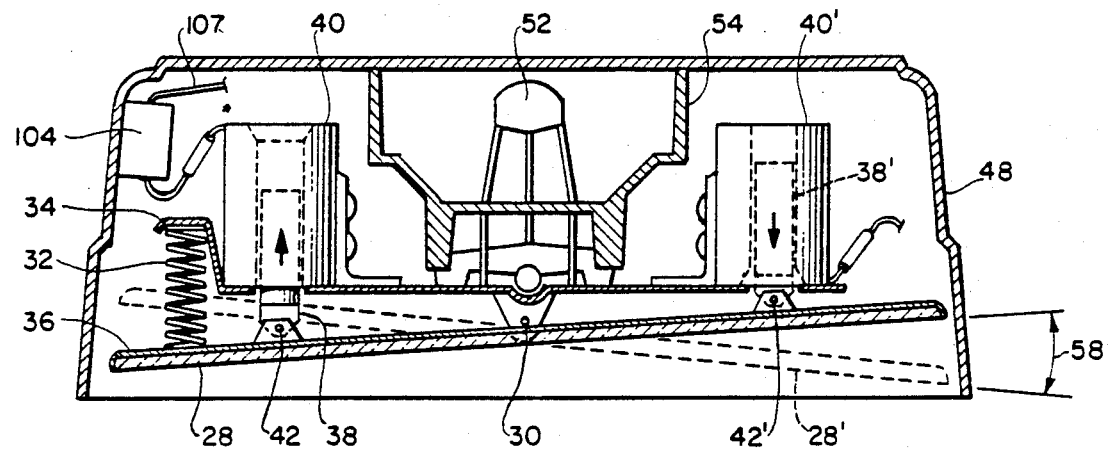
FIG. 7 is a top view in partial section of the side view mirror shown in FIG. 2 having a secondary solenoid replacing a counterweight.
Figure 8:
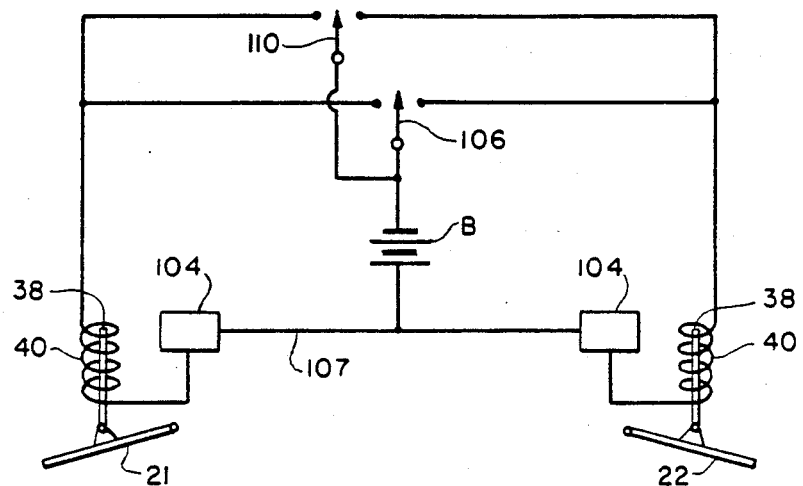
FIG. 8 is a schematic circuit diagram.

FIG. 7 shows a side view mirror similar to that shown in FIG. 2 having, however, the counterweight 50 is replaced with a secondary solenoid 40'. Both solenoids are energized simultaneously causing the rod 38 in solenoid 40 to be drawn inwardly and the corresponding rod 38' in solenoid 40' to be pushed outwardly as shown by the arrows. This action tilts the mirror 28 to the dotted position 28' about its pivot 30 against the compression of spring 32. Utilizing two counteracting solenoids in this manner assures an immediate response to the actuations of the manual control switches and provides additional force for this movement over the single solenoid 40 of FIG. 2. It is desirable that an appropriate two-second dwell be provided so that the mirror sweep of the blind area is instantaneous but of sufficient time duration to make that area remain visible through the use of known timer devices 104 in the solenoid circuit 107 shown in FIG. 8. Solenoid actuation means is achieved through usual manipulation of turn lever 10 or manually controllable button means 110 (see FIG. 1). A usual spring-biased control button at 110 permits the operator to energize the solenoid circuit energized by the car's battery B to achieve the desired sweep of the mirror while the button 110 is held. By such latter naturally usable means, the operator may note the pressure of traffic in a lane adjacent to the parking lane and parallel to the curb before opening the door on the driver's (left) side into said adjacent lane, serving thereby also to avoid accidents and injuries and to save lives.

If the car has both left and right mirrors, it is contemplated that they will be structured and arranged to automatically sweep simultaneously upon actuation of the manual button, and/or upon actuation of the turn signal on the steering wheel. Such steering wheel lever or control may be provided with a button for said sweeping operation without moving the turn signaling lever.

It has been found that a mirror 4.5 inches in length provides an adequate sweep. It is unnecessary to further extend the mirrors from the sides of the car, if constructed in accordance with the invention herein described, illustrated and claimed.

The disclosed constructions are practical, well-tested, economical and simplified for causing side view mirrors to effectively sweep and eliminate the blind areas, and to efficiently and effectively accomplish the desired purpose without an extension of the side view mirror laterally outwardly from the vehicle. The described and claimed structures thus effectively avoid dangerous protrusions of the side view mirrors and achieve their result in a simple, arcuate sweep and position. The means herein provided are novel and are very economical and very effective.

From the foregoing, those skilled in the art will readily understand and appreciate the nature of the invention and the manner in which it achieves and realizes the objects set forth in the foregoing, as well as the advantages that are apparent from the detailed description which is to be taken as illustrative and modifiable within the spirit of the invention and within the skill of those familiar with this art without departing from the invention as more fully defined in the appended claims.

What I claim is:

1. A motor vehicle side view mirror assembly comprising;
   (a) a mirror housing attachable to a motor vehicle;
   (b) a mirror mounting plate within said housing and pivotally affixed thereto about a generally vertical axis;
   (c) a mirror within said housing spaced from and extending in generally parallel relationship to said mounting plate, said mirror being supported by said mounting plate and pivotal with respect thereto about a generally vertical axis;
   (d) means associated with the mirror mounting plate for adjusting said place and supported mirror to a normal side viewing position;
   (e) at least one electrical solenoid means mounted on the mirror mounting plate, each solenoid means having an actuating arm movable upon electrical energization of said solenoid means between extended and retracted positions;

(f) means operatively connecting the actuating arm of each solenoid means to the mirror such that upon extension and retraction of said arm the mirror is caused to pivot about its generally vertical axis between its normal side viewing position and a swept viewing position to eliminate blind spots; and (g) electrical control means connected to the electrical solenoid means so as to control the extension and retraction of the actuating arm and thereby the position of the mirror.

2. The motor vehicle side view mirror assembly as claimed in claim 1 wherein the electrical control means includes timer means whereby the mirror is caused to dwell in its swept viewing position for a predetermined period of time.

3. The motor vehicle side view mirror assembly as claimed in claim 2 wherein the timer means causes the mirror to dwell for approximately two seconds in its swept viewing position.

4. The motor vehicle side view mirror assembly as claimed in claim 1 wherein each solenoid means is fixedly attached to the side of said mounting plate facing away from the mirror.

5. The motor vehicle side view mirror assembly as claimed in claim 1 wherein spring means is interposed between the mirror mounting plate and the mirror so as to urge the mirror toward its normal side viewing position.

6. The motor vehicle side view mirror assembly as claimed in claim 5 wherein ballast means is attached to the mirror mounting plate to absorb the shock of the mirror upon its return to its normal viewing position from its swept viewing position under the force of said spring means.

7. The motor vehicle side view mirror assembly as claimed in claim 1 wherein resilient stop means is attached to the mirror mounting plate and extends toward the mirror so as to cushion the return of the mirror to its normal viewing position from its swept viewing position.

8. A motor vehicle side view mirror assembly for providing a driver with normal side viewing and blind spot viewing of rear and adjacent vehicles comprising:

(a) a mirror housing attachable to the side of a motor vehicle;

(b) a mirror mounting plate within said housing and pivotally affixed thereto about a generally vertical axis;

(c) a mirror within said housing spaced from and extending in generally parallel relationship to said mounting plate between said plate and the open side of said housing, said mirror being supported by said mounting plate and pivotal with respect thereto about a generally vertical axis;

(d) means associated with the mirror mounting plate for adjusting said plate and supported mirror to a normal side viewing position;

(e) at least one electrical solenoid means mounted on the mirror mounting plate, each solenoid means having an actuating arm movable upon electrical energization of said solenoid means between extended and retracted positions;

(f) means operatively connecting the actuating arm of each solenoid means to the mirror such that upon extension and retraction of said arm the mirror is caused to pivot about its generally vertical axis between its normal side viewing position and a swept position to provide blind spot viewing; and (g) electrical control means connected to the electrical solenoid means so as to control the extension and retraction of the actuating arm and thereby the position of the mirror for normal viewing and blind spot viewing.

9. The motor vehicle side view mirror assembly as claimed in claim 8 wherein the electrical control means includes timer means whereby the mirror is caused to dwell in its swept position for a predetermined period of time for blind spot viewing.

10. The motor vehicle side view mirror assembly as claimed in claim 9 wherein the timer means causes the mirror to dwell for approximately two seconds in its swept position for blindspot viewing.

11. The motor vehicle side view mirror assembly as claimed in claim 8 wherein each solenoid means is fixedly attached to a side of said mounting plate away from the mirror.

12. The motor vehicle side view mirror assembly as claimed in claim 8 wherein spring means is interposed between the mirror mounting plate and the mirror so as to urge the mirror toward its normal side viewing position.

* * * * *